T. A. EDISON.
Telegraph Apparatus.
No. 158,787. Patented Jan. 19, 1875.
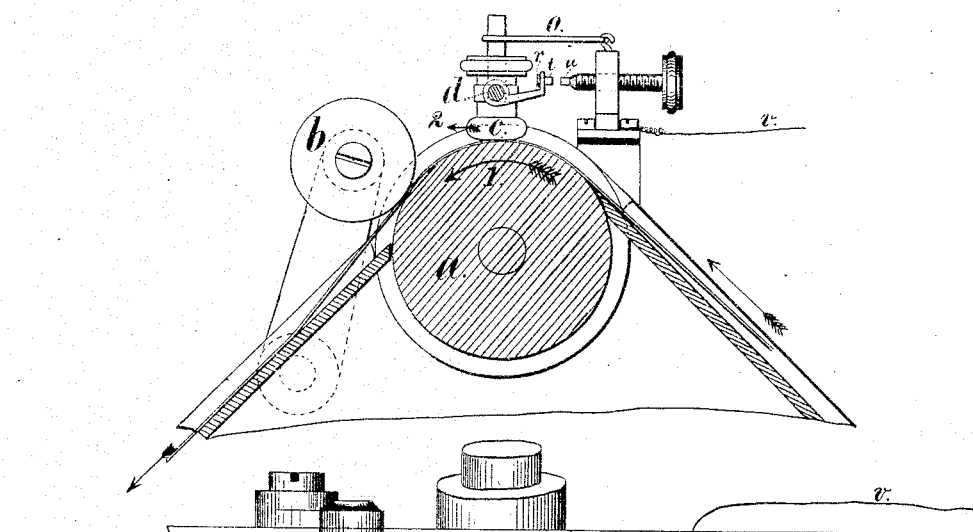
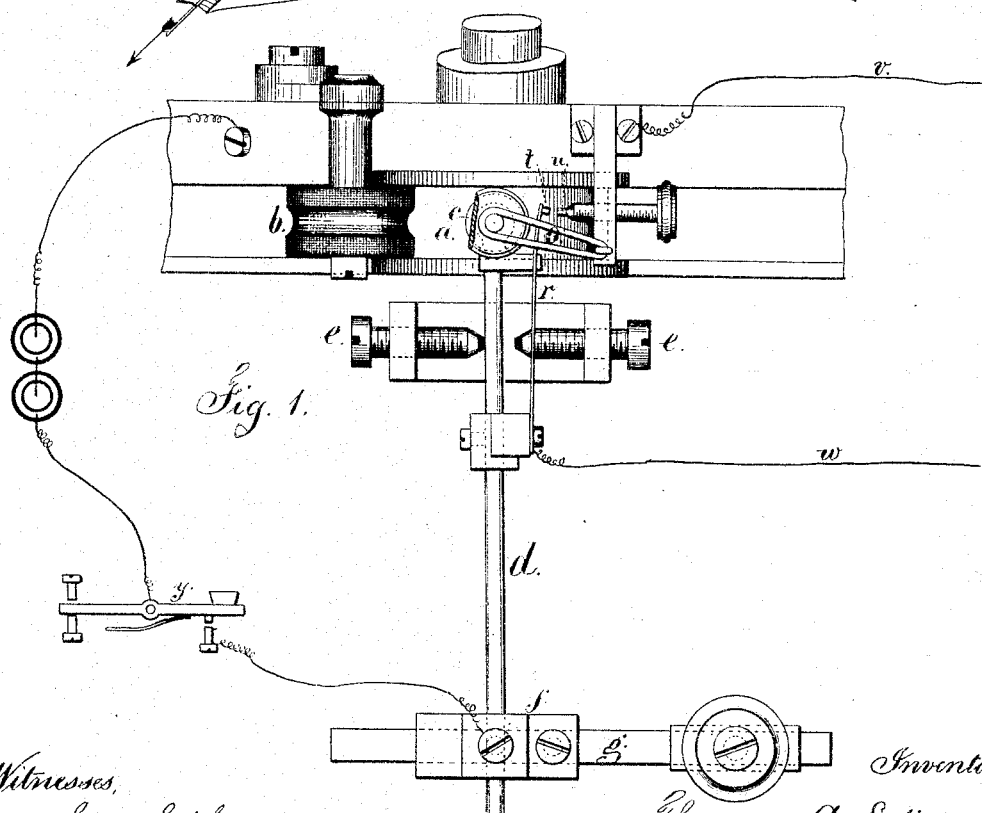
Witnesses,
Chas H. Smith
Geo. T. Pinckney
Inventor
Thomas A. Edison
per Lemuel W. Serrell
atty.

UNITED STATES PATENT OFFICE.

THOMAS A. EDISON, OF NEWARK, NEW JERSEY.

IMPROVEMENT IN TELEGRAPH APPARATUS.

Specification forming part of Letters Patent No. 158,787, dated January 19, 1875; application filed August 13, 1874.

*To all whom it may concern:*

Be it known that I, THOMAS A. EDISON, of Newark, in the county of Essex and State of New Jersey, have invented an Improvement in Telegraphs, of which the following is a specification:

In electric telegraphs motion has been obtained at a distance by a galvanometer and by an electro-magnet. Both of these are comparatively slow, and hence chemical decomposition has been resorted to for recording the characters sent from a distant station.

Heretofore there has been great difficulty in obtaining any means for repeating messages with high rates of speed, and magnets or galvanometers in an electric circuit always produce more or less disturbance by the secondary or induced current, and act to reduce the speed.

My invention is dependent on mechanical motion and electrical action, and responds to the most feeble currents when properly adjusted, and with very great rapidity; hence I term my invention the electric motograph.

The principles of its operation are that, when a moving surface is in contact with a slightly-yielding substance, the tendency is to move the latter by and with the former. If the circumstances of contact are varied the adhesion of the surfaces will be sufficient to cause the moving surface to move the yielding substance, or else to cause the yielding substance to slip more freely, and by its spring go in the opposite direction to the moving surface. I have discovered that the passage of electricity through the surfaces in contact will change the frictional adhesion, making it more or less according to the substances employed; and by balancing the mechanical forces so that when the surfaces in contact are not electrified the moving surface carries with it the yielding surface, and when electrified the yielding surface slips back over the moving surface, or vice versa, a mechanical movement is produced that is dependent on the electrical condition of the surfaces in contact; hence mechanical motion is obtained, first one way and then the other, that is as unlimited in its speed as the pulsations of electricity that pass, unobstructed by magnets or other hindrances, over the telegraphic lines.

In the drawing, Figure 1 is a plan of the apparatus, and Fig. 2 is a vertical section.

The drum $a$ is revolved by clock-work or other suitable means; and $b$ is a roller to press a strip of paper into contact with the drum $a$, so that said strip is drawn along with regularity; and $c$ is the frictional presser and yielding vibrator. This vibrator is at the end of an arm, $d$, that allows it to yield, and the extent of motion should be limited by the adjusting-screws $e$. I prefer to make this arm serve the purpose of a spring, although separate springs might be used to regulate the pressure of the vibrator on the moving surface, and the force applied to draw the vibrator in the opposite direction to the movement given by the moving surface $a$, as illustrated by the rubber spring at $o$. The spring-arm $d$ is upon the block $f$, that may be slid endwise upon the rod $g$, to regulate the power of the spring in moving the vibrator, and pressed down more or less to determine the friction between the vibrator and the moving surface.

If the surface of $a$ is moving in the direction of the arrow 1 and the parts are properly adjusted, the friction will be sufficient to move the vibrator slightly in the direction of the arrow 2; but when the electric current passes through the surfaces of $a$ and $i$ the frictional contact will become less, so that the spring will overcome the friction and vibrate $c$ in the other direction as the current is broken. The friction increasing, the vibrator moves the other way. If the surfaces in contact are of such a character that the frictional contact will be intensified by the electrical action, then the movements will be the reverse.

It will now be evident that the movement of the vibrator can be availed of for any electrical or telegraphic purpose.

By applying the spring $r$ and circuit-closing points $t$ and $u$, and insulating these parts, the local or relay circuit of which the wires $v$ and $w$ form parts will be opened and closed simultaneously, and in harmony with the key $y$ or other transmitter in the circuit that passes through the vibrator $c$ and drum $a$.

I do not limit myself to the use of any particular chemical substances, for water will, under some circumstances, answer for moistening the strip of paper or moving surface, or the moving surface may be of lead or other metal, and the surface of the vibrator be made of paper or other material, and moistened by preference.

In my experiments I have discovered that paper moistened with bromo chloralum and a lead vibrator connected to the positive pole increases the friction. I presume that the electric decomposition produces an effect similar to that resulting from the addition or removal of a lubricant, because, when the positive pole is connected with the vibrator the apparatus is not operative; hence the result named cannot proceed simply from the surfaces being electrified. Furthermore, the effect of relieving friction is most apparent at the commencement of the electric action; hence there may be a decomposition of the metallic oxide formed on the surface by the hydrogen evolved at the negative pole. With hydrate of potassa the resistance of the moistened paper to the passage of the current is but little, and excellent results are obtained.

My tests on different metals have shown that most all of the metals will operate to a greater or less extent with various solutions; but thallium and lead appear to be preferable, especially the latter, as acting with great delicacy where hydrogen is evolved by the decomposition; but I do not limit myself to any particular character of moving surface and vibrator so long as the characters of such surfaces are such that the frictional contact will be so changed when electrified as to cause or allow of the movement of the vibrator.

Paper moistened with alcohol, even absolute alcohol, will operate with a lead vibrator. With sulphate of quinine and hydrate of ammonia a platina vibrator will operate with either positive or negitive pole connected to the vibrator.

The motion of the vibrator may be made to record in ink dots and dashes by employing a small wheel inked by a fountain-wheel, and which is brought into contact with a moving strip of paper, or relieved therefrom by the movement of the vibrator.

I claim as my invention—

1. A moving surface in contact with a yielding vibrator, through which pulsations of electricity are passed when such surfaces in contact are of such a character that the friction will be varied by the electrical condition, substantially as set forth.

2. A vibrator, in combination with means for adjusting the pressure of the vibrator on the moving surface, and of the yielding force that moves the vibrator in the opposite direction to that derived from the moving surface, substantially as set forth.

3. The combination of a yielding vibrator, operated substantially as set forth, with a secondary circuit actuated by such vibrator, substantially as specified.

4. A telegraph instrument with a vibrator that is controlled by electro-chemical decomposition.

Signed by me this 7th day of August, A. D. 1874.

THOMAS A. EDISON.

Witnesses:
   GEO. T. PINCKNEY,
   CHAS. H. SMITH.